United States Patent
Mohr

(10) Patent No.: US 12,415,604 B2
(45) Date of Patent: Sep. 16, 2025

(54) AIRCRAFT STORAGE RETAINER

(71) Applicant: Textron Aviation Inc., Wichita, KS (US)

(72) Inventor: Sidney Aloysius Mohr, Clearwater, KS (US)

(73) Assignee: Textron Innovations Inc., Providence, RI (US)

( * ) Notice: Subject to any disclaimer, the term of this patent is extended or adjusted under 35 U.S.C. 154(b) by 142 days.

(21) Appl. No.: 17/938,324

(22) Filed: Oct. 5, 2022

(65) Prior Publication Data
US 2023/0110736 A1 Apr. 13, 2023

Related U.S. Application Data

(60) Provisional application No. 63/254,759, filed on Oct. 12, 2021.

(51) Int. Cl.
*B64D 11/00* (2006.01)
*B64D 45/00* (2006.01)

(52) U.S. Cl.
CPC .... *B64D 11/003* (2013.01); *B64D 2045/0075* (2013.01)

(58) Field of Classification Search
CPC .. B64D 11/003; B64D 25/06; B64D 11/0627; B64D 11/0636; B64D 11/0689
See application file for complete search history.

(56) References Cited

U.S. PATENT DOCUMENTS

| | | | |
|---|---|---|---|
| 4,964,771 A * | 10/1990 | Callihan | B60R 7/02 410/96 |
| 4,969,623 A * | 11/1990 | Bernier | B64D 43/00 248/442.2 |
| 6,109,442 A | 8/2000 | Roegner | |
| 6,793,300 B1 | 9/2004 | Gillette | |
| 10,293,944 B2 * | 5/2019 | Spagl | B64D 11/0698 |
| 10,800,528 B1 * | 10/2020 | Williams | B60P 7/0807 |
| 11,884,402 B2 * | 1/2024 | Hughes | B60R 7/005 |
| 12,312,088 B2 * | 5/2025 | Senechal | B64D 11/0602 |
| 2011/0010854 A1 | 1/2011 | Zerhusen et al. | |
| 2017/0164738 A1 * | 6/2017 | Clements | A47B 95/008 |
| 2018/0118349 A1 * | 5/2018 | Rowe | B64D 11/04 |
| 2022/0112027 A1 * | 4/2022 | Melton | B64D 11/003 |

FOREIGN PATENT DOCUMENTS

FR 1285610 A * 2/1962

OTHER PUBLICATIONS

"Fairchild C-119J Flying Boxcar," Mar. 14, 2016, National Museum of the United States Air Force, URL "https://web.archive.org/web/20210805111155/https://www.nationalmuseum.af.mil/Visit/Museum-Exhibits/Fact-Sheets/Display/Article/197556/fairchild-c-119j-flying-boxcar/" (Year: 2016).*

* cited by examiner

*Primary Examiner* — Joshua J Michener
*Assistant Examiner* — Ryan Andrew Yankey
(74) *Attorney, Agent, or Firm* — Avek IP, LLC

(57) ABSTRACT

A storage retainer includes an open recessed area configured to store materials in an aircraft. The retainer includes an aft wall and a lower shelf for receiving materials thereon. The retainer includes one or more straps attach to a panel for securing objects, such as a flight manual, against the aft wall and the lower shelf. The straps attach to one or more anchors on the aft wall and one or more anchors on the lower shelf, therein biasing the panel towards the aft wall and the lower shelf to secure the materials in the open recessed area for easy access thereto.

18 Claims, 3 Drawing Sheets

AIRCRAFT STORAGE RETAINER

CROSS-REFERENCE TO RELATED APPLICATIONS

This application claims the benefit of U.S. Provisional application No. 63/254,759 entitled "Aircraft Storage Retainer" and filed on Oct. 12, 2021, which is herein incorporated by reference in its entirety.

BACKGROUND

1. Field

Embodiments of the invention relate generally to the field of storage containers, and more specifically to a storage retainer for holding materials, books, or pamphlets in an aircraft.

2. Description of the Related Art

Many types of storage systems for use onboard aircraft are known. For example, U.S. Pat. No. 6,793,300 to Gillette discloses an apparatus for holding a cutting board in a kitchen counter and method for installation. U.S. Pat. No. 6,109,442 to Roegner discloses a case for the storage of nail care items. U.S. Patent Application Publication No. 2011/0010854 to Zerhusen et al. discloses a siderail with an indented portion that defines a storage area to place objects within and a retaining element to maintain the objects in the storage area. U.S. Pat. No. 10,293,944 to Spagl discloses a crew attendant seat positioned within a wall of an aircraft cabin. U.S. Pat. No. 4,969,623 to Bernier discloses an apparatus for holding documents in front of pilots mid-flight.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the techniques described herein relate to a storage retainer for storing materials in an aircraft, including: an aft wall; a fixed shelf having an upper surface for receiving materials thereon; a panel; one or more straps for attaching the panel to the aft wall and to the fixed shelf; one or more upper anchors attached to the aft wall for receiving a first end of the one or more straps, respectively; and one or more lower anchors attached to the lower shelf for receiving a second end of the one or more straps, respectively, wherein the one or more straps and the panel are configured to stow materials on the fixed shelf against the aft wall.

In some aspects, the techniques described herein relate to an aircraft storage retainer, including: a horizontal platform having a front edge and a back edge opposite the front edge; a vertical wall extending upwardly above the back edge of the horizontal platform; and a strap having a first end and a second end, wherein the strap is mechanically coupled by the first end to the vertical wall above the horizontal platform, and the strap is mechanically coupled by the second end to the front edge of the horizontal platform, wherein the strap is configured to secure an object on the horizontal platform against the vertical wall.

BRIEF DESCRIPTION OF THE DRAWING FIGURES

Embodiments of the invention are described in detail below with reference to the attached drawing figures, wherein.

Figure 1:
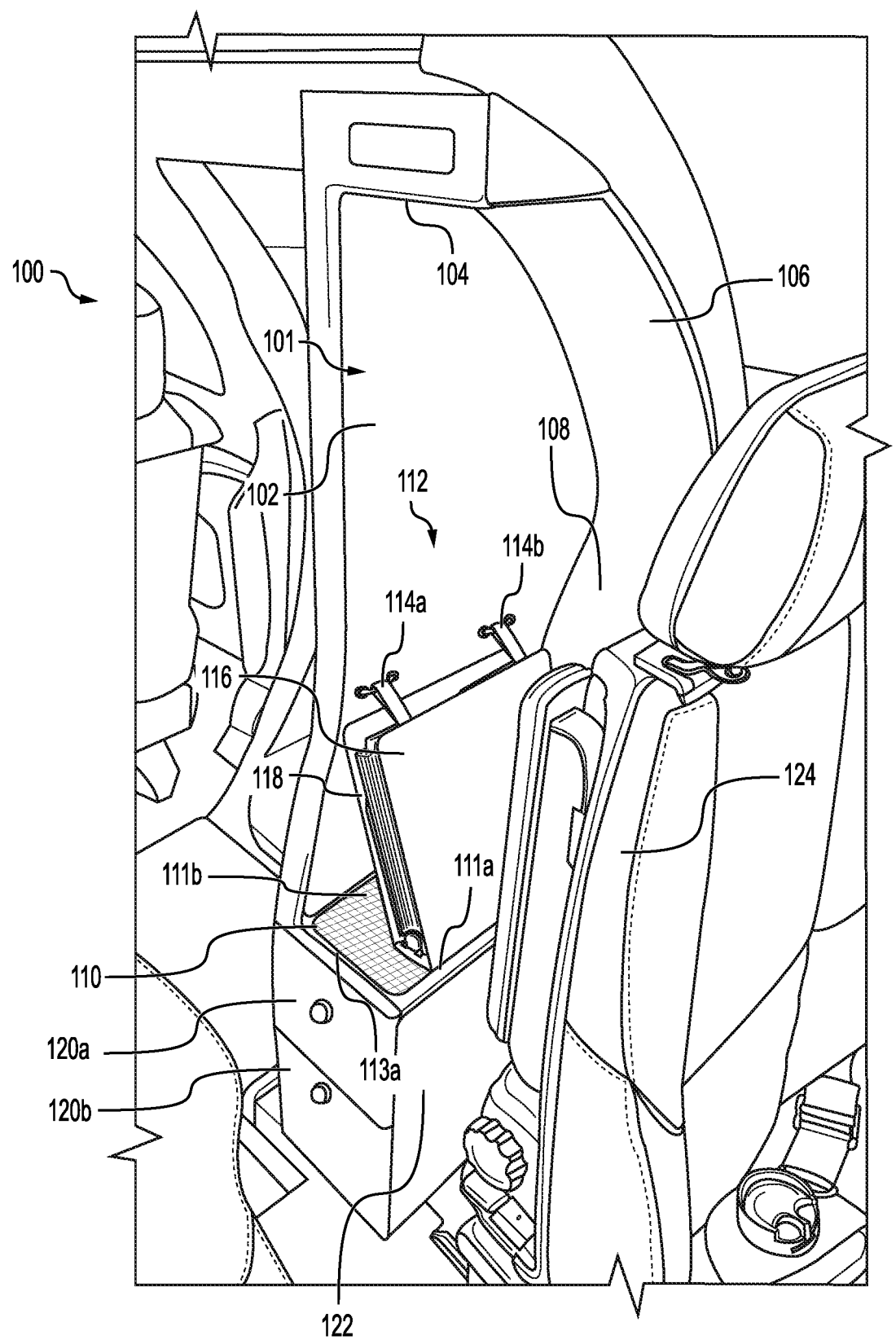
FIG. 1 is a perspective view of an embodiment of a storage retainer.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

There is a need for storing materials, such as manuals, in an easily accessible location in an aircraft. Aircraft generally maintain an aircraft flight manual (AFM), which may be specific to that aircraft. The AFM contains important information required to operate that aircraft. This information may include specific details such as gross weight, maximum ramp weight, maximum takeoff weight, manufacturer's empty weight, operating empty weight, center of gravity limitations, zero-fuel weight, takeoff distance, and landing distances. The AFM also typically includes important information regarding abnormal operations and emergency operations. As such, providing the crew with easy, unfettered access to the AFM in the case of an emergency is important for the safety of the crew and passengers onboard.

Due to typical forces exerted on an aircraft during takeoff, flight, and landing, the AFM also needs to be stowed in a secure position that will not become unreachable during flight due to unexpected forces encountered in the aircraft, such as turbulence. Because of this, AFM's are usually stowed in a cabinet compartment behind a latching door or carried directly by the co-pilot. Storing the AFM in a cabinet presents the problem of difficult access during flight, especially during times of extreme turbulence or potential emergencies. Alternatively, the co-pilot carrying the AFM directly occupies at least one hand of the co-pilot, who may need both hands to react to unexpected emergencies encountered during flight. The present invention solves the aforementioned problems by providing both safe storage and easy access of the AFM in an aircraft cockpit.

FIG. 1 shows an embodiment of storage retainer 100 located within a cockpit of an aircraft. The storage retainer 100 includes an open recessed area 101. In some embodiments, the open recessed area 101 is formed by an aft wall 102, a ceiling 104, an upper coved side wall 106, and a lower axial side wall 108 such that the open recessed area 101 remains open on an inboard side and on a forward side. In some embodiments, the aft wall 102 is a substantially vertical wall. In some embodiments, the ceiling 104 is roughly parallel to the flooring of the aircraft. In some embodiments, the ceiling 104 may define an area for airplane equipment to reside. The ceiling 104 may include, for example, lighting, a speaker, electrical equipment, further storage, etc. The open recessed area 101 is further defined by a shelf 110, which forms a lower surface. In some embodiments, the shelf 110 is the base surface for receiving the materials to be stowed. As depicted in the figures, the shelf 110 is a fixed substantially horizontal platform that is openly accessible. In other words, shelf 110 is not a hinged shelf and shelf 110 is not enclosed.

In some embodiments, the lower axial side wall 108 is approximately perpendicular to the shelf 110. In other embodiments, the lower axial side wall 108 is angled upwards and away from the shelf 110 forming either a curved or flat surface and connected to upper coved side wall 106 with a concave or convex angle. In some embodiments, the upper coved side wall 106 is curved. In some embodiments, the lower axial side wall 108 and the upper coved side wall 106 are configured as a single side panel. In some embodiments, the ceiling 104, the upper coved side wall 106, and the lower axial side wall 108, are configured to conform to and fit within the interior contour of an inner fuselage wall of an aircraft.

Stowing materials, such as an AFM, or other flight manuals or documents, in the open recessed area 101 is accomplished using a retainer system 112. In some embodiments, retainer system 112 includes a panel 116 and one or more attachment means, such as straps 114a and 114b, for attaching the panel 116 to the open recessed area 101. In the FIG. 1 embodiment, straps 114a, 114b are attached directly to panel 116. For example, the panel 116 may comprise a fabric cover and the straps are sewn to the fabric cover. Other embodiments of the straps 114a, 114b and the panel 116 of the retainer system 112 having alternative attachment means therebetween will be discussed in greater detail below with reference to FIG. 2. The combination of the retainer system 112 and the shelf 110 provides a secure space for stowing materials, such as manual 118, enabling the materials to be easily accessed with one-hand by a person sitting in a seat located in front thereof, such as a pilot seat 124, or by a person, such as a co-pilot, sitting in a seat opposite the pilot seat 124 (not shown).

Figure 2:
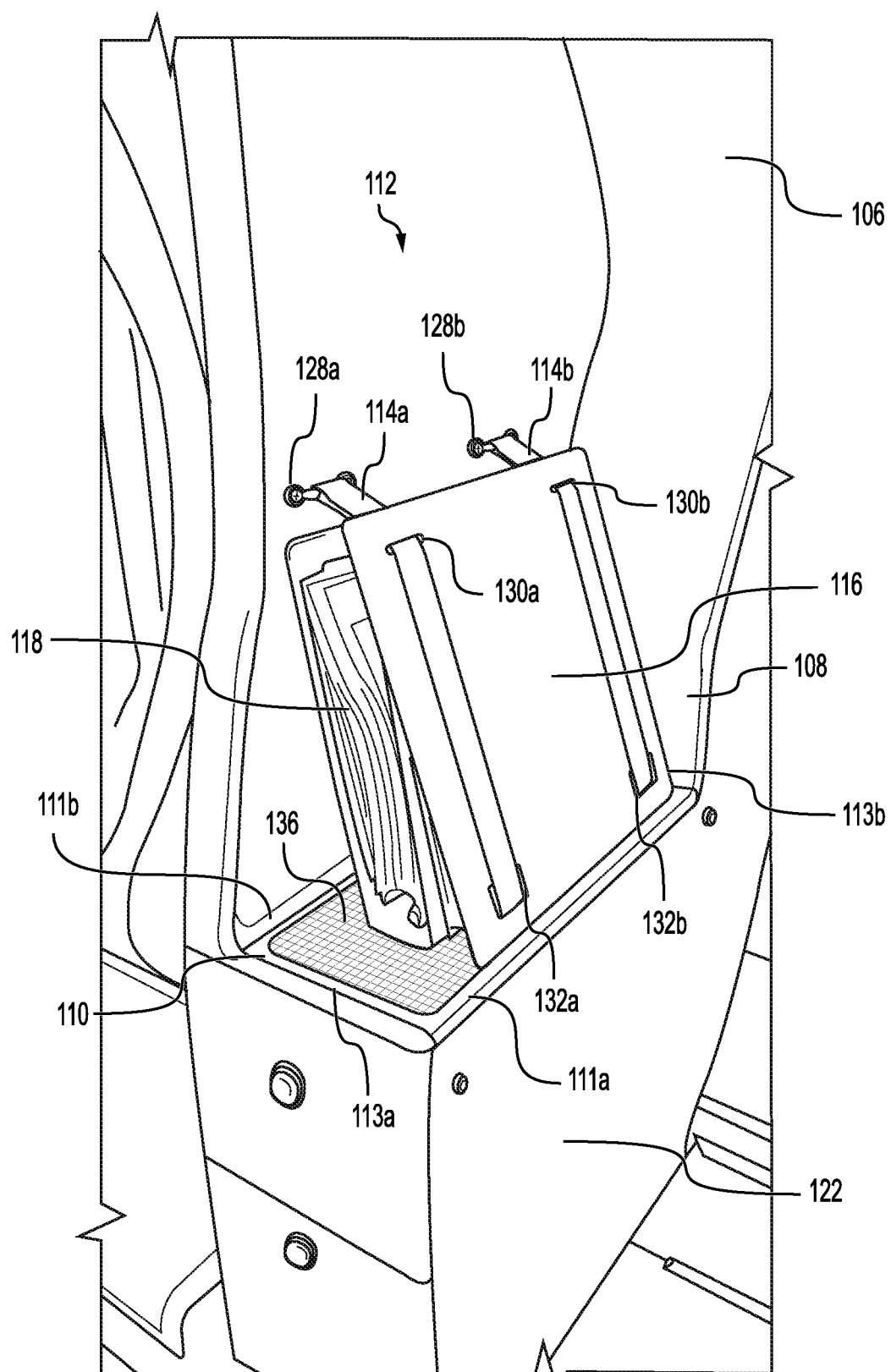
FIG. 2 is an enlarged perspective view of the embodiment of the storage retainer.

FIG. 2 is a close-up perspective view showing the retainer system 112. In some embodiments, the shelf 110 is approximately horizontal and may be substantially parallel with the flooring of the aircraft. The shelf 110 may extend from the aft wall 102 to a front wall 122, which may be adjacent the back of a seat, such as the pilot's seat or co-pilot's seat. The front wall 122 extends beneath the shelf 110 but not above the shelf 110 to maintain open access to the open recessed area 101 behind a backside of the pilot seat 124. The shelf 110 further includes a front lip 111a, a back lip 111b, a first side lip 113a, and a second side lip 113b forming a recessed upper surface 136. Front lip 111a, back lip 111b, first side lip 113a, second side lip 113b are raised portions that extend upwardly from outside edges of the shelf 110 to form a raised lip around a periphery of the recessed upper surface 136 for preventing materials held on the shelf 110 from sliding off. In some embodiments, the open recessed area 101 is defined by front wall 122, aft wall 102, upper coved side wall 106, lower axial side wall 108, and shelf 110. Back lip 111b interfaces with the bottom of aft wall 102 and second side lip 113b interfaces with the bottom of lower axial side wall 108. Front lip 111a interfaces with the top of front wall 122. Easy access to the materials is available from the opening located above first side lip 113a.

Referring again to FIG. 1, beneath the shelf 110, there may be one or more cabinets or drawers 120a, 120b. Cabinets 120a and 120b may include safety features, such as locks, such that they will be maintained in a stowed/closed configuration unless a crew member or passenger unlocks them. In some embodiments, the area defined by shelf 110, aft wall 102, and front wall 122 may define a storage space for other aircraft equipment, such as lighting, speakers, general storage, electrical equipment, etc. It will be noted that while two cabinets 120a, 120b are depicted, it is contemplated that any reasonable number of cabinets or drawers may be included in this space.

In some embodiments, the open recessed area 101 is configured to provide sufficient space for storage of an object or materials, such as manual 118, behind the pilot seat 124. Normally, the space behind the pilot seat 124 is limited due to the constraints on space within the fuselage of an aircraft. The open recessed area 101 provides space that would ordinarily be occupied directly behind the pilot seat 124.

Referring now to FIG. 2, components specific to the retainer system 112 are discussed. As previously mentioned, retainer system 112 may include retaining means that are configured to bias panel 116 towards aft wall 102. Retaining means may include any mechanical means for connecting the panel 116 to the open recessed area 101 for providing a space for holding objects therein. Retaining means may include snaps, hooks, loops, hook-and-loop fasteners, adhesives, or other retaining mechanisms. In one embodiment, retaining means comprises straps 114a, 114b as shown. It is contemplated that, while depicted as two straps in FIG. 2, any reasonable number of straps may be used in retainer system 112. For example, one, two, three, four, five, or more straps could be used.

Straps may be formed of a material comprising fabric and/or elastic. For example, straps may comprise one or more of latex, rubber, polyester fibers, etc. In some embodiments, straps 114a, 114b may comprise a substantially elastic material to allow for stretching of straps 114a, 114b to accommodate insertion and/or removal of objects, such as manual 118. Furthermore, elasticity of straps 114a, 114b biases objects located within the storage retainer 100, such as manual 118, towards the aft wall 102 and shelf 110, thereby preventing movement of manual 118, or other materials, when stowed. Straps 114a, 114b may be stretchable and/or expandable such that they present a force for biasing the panel 116 inwards and downwards.

In some embodiments, an upper end of straps 114a, 114b may be mechanically coupled to the aft wall 102 by anchoring means, such as upper anchors 128a, 128b. Straps 114a, 114b may be permanently or removably attached to upper anchors 128a, 128b. In some embodiments, straps 114a, 114b may be attached to upper anchors 128a, 128b by sewing straps 114a, 114b around upper anchors 128a, 128b. In some embodiments, straps 114a, 114b, may be wrapped around upper anchors 128a, 128b and attached to themselves via a harness or buckle. In these embodiments, the harness or buckle may allow for adjusting the length of straps 114a, 114b to customize the space between panel 116 and aft wall 102 to better secure objects, such as manual 118. In some embodiments, straps 114a, 114b may wrap around upper anchors 128a, 128b and attach via hook and loop fasteners or snaps. In some embodiments, straps 114a, 114b may wrap around upper anchors 128a, 128b and attach via an adhesive. It will be noted that aforementioned listings of attachment means are not exhaustive, and any method of attaching straps known by a person skilled in the art may be used.

It is contemplated that upper anchors 128a, 128b may comprise any shape configured to receive a strap thereon or therearound. In some embodiments, upper anchors 128a, 128b may comprise a shape with a slightly raised portion with at least one anchoring point on each end. In some embodiments, upper anchors 128a, 128b may comprise a footman's loop shape. Upper anchors 128a, 128b may be attached to the aft wall 102 with a mechanical fastening means, such as nails, screws, or bolts.

A first portion of straps 114a, 114b, such as an upper end, may be received through upper slots 130a, 130b located in panel 116. In some embodiments, upper slots 130a, 130b are of a substantially similar width to the straps 114a, 114b, therein preventing substantial movement of panel 116 in the outboard or inboard directions. In some embodiments, upper slots 130a, 130b may be substantially rectangular or square. In some embodiments, straps 114a, 114b are received through upper slots 130a, 130b in the forward direction (i.e., towards the pilot seat 124). In some embodiments, straps 114a, 114b are received through upper slots 130a, 130b in the aft direction (i.e., towards the rear portion of the aircraft).

Lower slots 132a, 132b formed in panel 116 are configured to receive a second portion of straps 114a, 114b, such as a lower end of the straps. In embodiments, lower slots 132a, 132b are of a substantially similar width to the straps 114a, 114b, therein preventing substantial movement of panel 116 in the inboard or outboard directions. In some embodiments, lower slots 132a, 132b may be substantially rectangular or square. In some embodiments, straps 114a, 114b are received through lower slots 132a, 132b in the forward direction (i.e., towards the pilot seat 124). In some embodiments, straps 114a, 114b are received through lower slots 132a, 132b in the aft direction (i.e., towards the rear portion of the aircraft).

Figure 3:
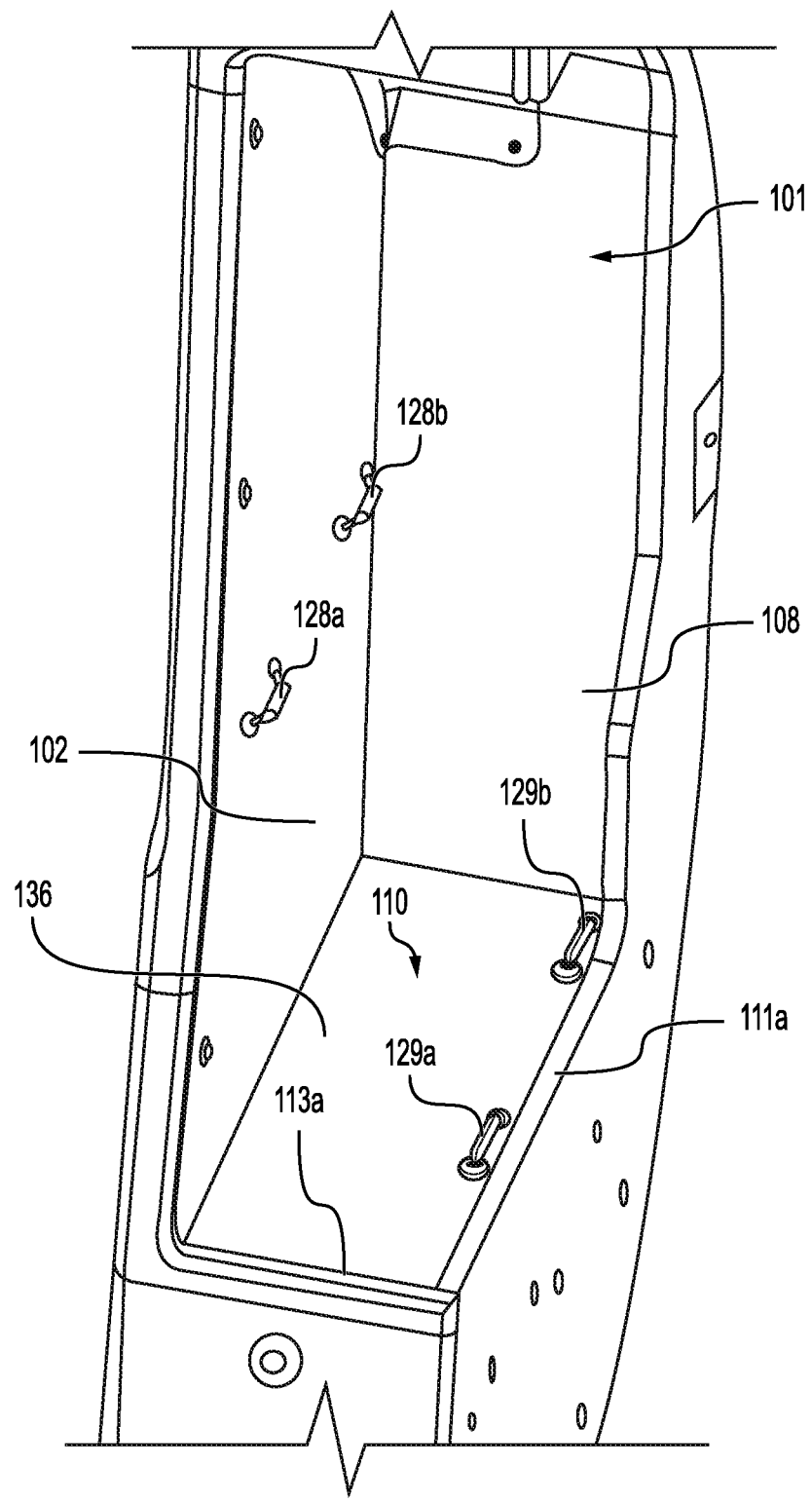
FIG. 3 is a perspective view showing the recessed area of the storage retainer.

FIG. 3 is a perspective view showing the recessed upper surface 136 of shelf 110 with the retainer system 112 removed for clarity of illustration. In some embodiments, the lower end of straps 114a, 114b attaches to shelf 110 via lower anchors 129a, 129b. The lower anchors 129a, 129b are mounted immediately adjacent the front lip 111a of the shelf 110 and may be of a similar configuration to the upper anchors 128a, 128b described above. However, in some embodiments, the lower anchors 129a, 129b may be of a different configuration from upper anchors 128a, 128b. Lower anchors 129a, 129b may be spaced a distance from the front lip 111a of the shelf 110 on the recessed upper surface 136 to align with a position of the upper anchors 128a, 128b in the inboard/outboard direction.

In some embodiments, panel 116 may include a cover (not shown) configured to obscure the view of upper slots 130a, 130b, lower slots 132a, 132b, and straps 114a, 114b. In some embodiments, panel 116 may comprise a substantially rigid material, such as a hard plastic or thin metal. In some embodiments, panel 116 may comprise a flexible or stretchy material having elasticity. In some embodiments, panel 116 may comprise a thermoform sheet material, such as Kydex®. In some embodiments, panel 116 may comprise a firm foam material. In some embodiments, panel 116 may comprise a substantially rigid material encased in a fabric. In some embodiments, panel 116 may comprise a grippy material or coating on an outer surface.

In some embodiments, the recessed upper surface 136 of shelf 110 may be textured or roughened to prevent the sliding of objects received thereon, such as manual 118. In some embodiments, the recessed upper surface 136 may include a coating of a low-slip material with a high friction coefficient (e.g., a friction coefficient greater than 0.2) to resist slipping of objects thereon. In some embodiments, the recessed upper surface 136 may include a grippy material thereon. In some embodiments, the recessed upper surface 136 may include a rubberized material thereon. In some embodiments, the recessed upper surface 136 may comprise a silicone rubber material thereon. In some embodiments, the recessed upper surface 136 may include a sticky coating for gripping onto objects, such as manual 118.

The storage retainer 100 is configured to restrict movement of objects caused by aircraft motion in any direction when stowed. For example, the aft wall 102 prevents movement of manual 118 in the aft direction (i.e., towards the rear portion of the plane). The lower axial side wall 108 prevents movement of manual 118 in the outboard direction (i.e., away from the aisle of the aircraft). The panel 116 in combination with straps 114a, 114b, and front lip 111a restricts movement of manual 118 in the forward direction (i.e., towards pilot seat 124) and/or the upward direction. First side lip 113a restricts movement of manual 118 in the inboard direction (i.e., toward the aisle of the aircraft). Additionally, the recessed upper surface 136 increases friction against manual 118, thereby restricting sliding in the aft, outboard, forward, or inboard direction. Furthermore, straps 114a, 114b bias panel 116, and therefore manual 118, backwardly against aft wall 102 and downwardly against shelf 110, placing further restraint on movement of manual 118 in any direction. However, a passenger or crew member may easily access manual 118 via the opening opposite from lower axial side wall 108, such as with one hand. By lifting and pulling on objects, such as manual 118, a passenger or crew member may effectively remove manual 118, or other materials, from the stowed position. Therefore, the retainer system 112 located in the open recessed area 101 provides easy access and subsequent stowing of the manual 118.

It is contemplated that storage retainer 100 may be located on either side, or both sides, of the aircraft (e.g., behind the pilot's seat, behind the co-pilot's seat, or behind both the pilot's seat and the co-pilot's seat).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A storage retainer for storing materials in an aircraft, comprising:
   an aft wall;
   a fixed shelf extending forward from the aft wall, wherein the fixed shelf comprises having an upper surface for receiving one or more objects thereon;
   a biased panel;
   one or more elastic straps for securing the biased panel to the aft wall and to the fixed shelf, wherein the one or more elastic straps allow for an outward flexing of the biased panel to create an object-receiving space between the aft wall and the biased panel;
   one or more upper anchors attached to the aft wall for receiving a first end of the one or more elastic straps, respectively; and
   one or more lower anchors attached to a forward end of the fixed shelf for receiving a second end of the one or more elastic straps, respectively,
   wherein the one or more elastic straps and the biased panel establish an inward elastic bias, the inward elastic bias allows for an outward flexibility in the biased panel allowing the insertion into, accommodation in, and removal of the one or more objects from the object-receiving space;
   one or more upper slots disposed in an upper portion of the biased panel; and
   one or more lower slots disposed in a lower portion of the biased panel, wherein the one or more upper slots and the one or more lower slots are each configured to receive a respective strap of the one or more elastic straps,
   wherein each of the respective straps are received outwardly through the one or more upper slots and inwardly through the one or more lower slots, such that each of the respective straps wraps over an outer surface of the biased panel.

2. The storage retainer of claim 1, comprising a ceiling above the fixed shelf and a side wall against an inner fuselage wall of the aircraft.

3. The storage retainer of claim 2, wherein the object-receiving space is formed by the aft wall, the fixed shelf, the side wall and the ceiling, wherein the object-receiving space is open on an inboard side.

4. The storage retainer of claim 3, wherein the object-receiving space is positioned behind a pilot seat of the aircraft and the storage retainer is configured to be accessible to a co-pilot seated opposite the pilot.

5. The storage retainer of claim 1, wherein the fixed shelf comprises:
   a front lip extending upwardly from the fixed shelf on a forward side, wherein an end of the biased panel presses outwardly against the front lip.

6. The storage retainer of claim 5, wherein the one or more lower anchors are attached to the forward side of the fixed shelf immediately adjacent to the front lip.

7. The storage retainer of claim 1, wherein the fixed shelf comprises a low-slip material to resist slipping of the one or more objects while stowed during motion of the aircraft.

8. The storage retainer of claim 1, wherein the fixed shelf forms a top side of a cabinet, the cabinet having at least one drawer located beneath the fixed shelf.

9. The storage retainer of claim 1, wherein the biased panel comprises a substantially rigid material.

10. An aircraft storage retainer, comprising:
    a horizontal platform having a raised front edge and a back edge opposite the raised front edge;
    a vertical wall extending upwardly above the back edge of the horizontal platform; and a biased panel; and
    an elastic strap having a first end and a second end, wherein the elastic strap is mechanically coupled by the first end to the vertical wall above the horizontal platform, and the elastic strap is mechanically coupled by the second end near the raised front edge of the horizontal platform,
    wherein the elastic strap is received outwardly through an upper anchor disposed on the vertical wall and inwardly through a lower anchor disposed on the horizontal platform such that the elastic strap wraps over an outer facing surface of the biased panel;
    wherein adjusting the length of the elastic strap allows for customizing a size of an object-receiving space established on the horizontal platform between the biased panel and the vertical wall by changing a gap creating space between the biased panel and the vertical wall to allow for the insertion into, accommodation of, and removal of differently sized objects.

11. The aircraft storage retainer of claim 10, wherein the horizontal platform comprises a recessed surface and a raised lip around a periphery of the recessed surface.

12. The aircraft storage retainer of claim 10, wherein the biased panel has a first slot and a second slot, each configured to receive the elastic strap, wherein the biased panel is configured for securing the object against the vertical wall.

13. The aircraft storage retainer of claim 10, wherein the horizontal platform is disposed behind a pilot seat in an aircraft cockpit and the vertical wall is disposed aft of the horizontal platform.

14. The aircraft storage retainer of claim 13, comprising an open area that is recessed behind a backside of the pilot seat.

15. The aircraft storage retainer of claim 14, wherein the object is an aircraft flight manual configured for stowing beneath the elastic strap, and the open area is accessible to a pilot or co-pilot for accessing the aircraft flight manual.

16. The storage retainer of claim 1, wherein each of the elastic straps are made adjustable and wrap around a respective anchor via hook and loop fasteners or snaps allowing for a change in the size of the object-receiving space.

17. An aircraft storage retainer, comprising:
    an aft wall;
    a fixed shelf extending rearward from the aft wall, wherein the fixed shelf comprises an upper surface for receiving one or more objects thereon, wherein the upper surface comprises an upwardly raised lip along its peripheral edges;
    one or more elastic straps biasing a panel towards the aft wall and downwards onto the fixed shelf, wherein the one or more elastic straps allow for an outward flexing of the panel to create an object-receiving space between the aft wall and the panel allowing for receipt and wedging of one or more objects in the object-receiving space;
    an upwardly raised lip on an edge of the fixed shelf opposite the aft wall, the upwardly raised lip catching a lower edge of the panel;
    one or more upper anchors attached to the aft wall above the fixed shelf for receiving a first end of the one or more elastic straps, respectively; and
    one or more lower anchors attached to a forward end of the fixed shelf for receiving a second end of the one or more elastic straps, respectively, wherein a respective elastic strap is received outwardly through the upper anchor and inwardly through the lower anchor such that the respective elastic strap wraps over an outer facing surface of the panel; and wherein the one or more elastic straps and the panel along with an inward elastic bias existing in the one or more elastic straps allows for the expandability of the panel outward for the insertion of, accommodation in, and removal of the one or more objects from the object-receiving space.

18. The storage retainer of claim 17, wherein the fixed shelf, the panel, and one or more elastic straps are together configured to allow the receipt of a manual upon a user pulling the panel outward and securing the manual upon a release of the panel.

* * * * *